Oct. 30, 1951  E. F. ZUBER  2,573,293
WAGON BOX

Filed March 4, 1946  2 SHEETS—SHEET 1

INVENTOR.
ERVIN FRANZ ZUBER
BY
R. Donald Pitts
AGENT.

Oct. 30, 1951 E. F. ZUBER 2,573,293
WAGON BOX
Filed March 4, 1946 2 SHEETS—SHEET 2
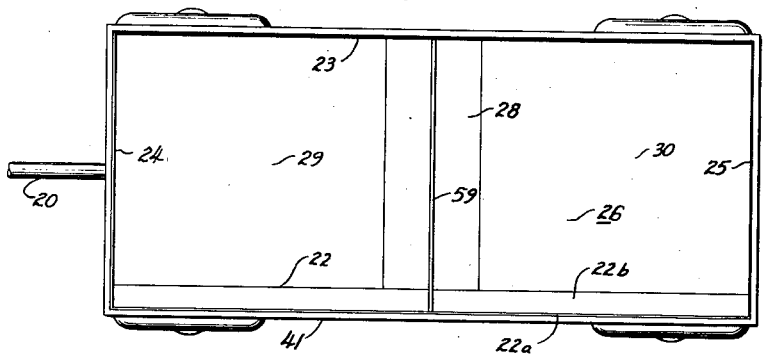
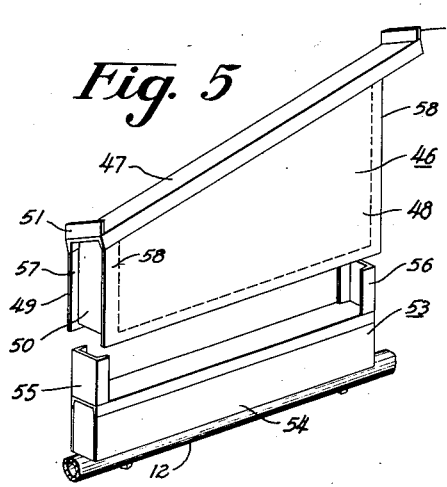
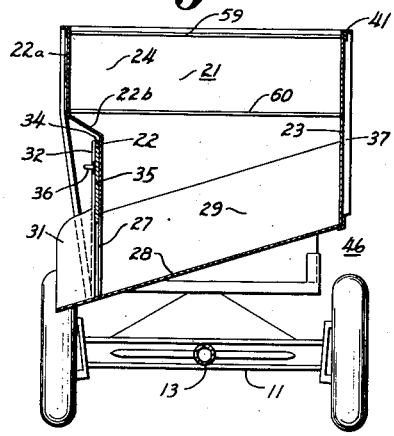
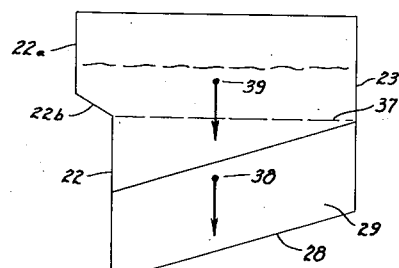
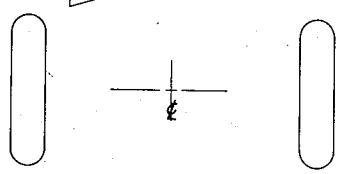
INVENTOR.
ERVIN FRANZ ZUBER
BY
AGENT.

Patented Oct. 30, 1951

2,573,293

UNITED STATES PATENT OFFICE 2,573,293

WAGON BOX

Ervin Franz Zuber, Mount Vernon, Iowa

Application March 4, 1946, Serial No. 651,806

5 Claims. (Cl. 298—7)

This invention relates to vehicle boxes, or so-called wagon boxes, and has particular relation to devices of this nature adapted especially for farm use.

A primary object of my invention is the provision of an improved vehicle or wagon box particularly adapted for the handling of bulk materials, such as grain and the like.

Another primary object of my invention is the provision of a wagon box so shaped as to be side unloading and substantially self-unloading.

A further object of my invention is the provision of a wagon box of this character which is so shaped and so mounted that its center of gravity will, for all practical purposes, be directly over the center line of the supporting vehicle when the box is either partly or completely filled.

A still further object of my invention is the provision of a side-delivery wagon box, the discharge opening of which may be adjusted vertically, to a limited extent, relative to the ground.

Other and further features and objects of the invention will be more apparent to those skilled in the art upon a consideration of the accompanying drawings and following specification, wherein is disclosed a single exemplary embodiment of the invention, with the understanding, however, that such changes may be made therein as fall within the scope of the appended claims, without departing from the spirit of the invention.

In the drawings:

Figure 3 is a view in top elevation of the device shown in Figure 2.

Figure 4 is a view, partly in elevation and partly in section, taken along the line 4—4 of Figure 2.

Figure 5 is a detail view in perspective of a bolster of the vehicle shown in Figure 2 along with the supporting portion of the chassis, and Figure 6 is a diagrammatic sketch illustrating the shape of my improved wagon box, and the manner of arranging and positioning the device relative to the chassis to secure a balanced load.

Figure 1:
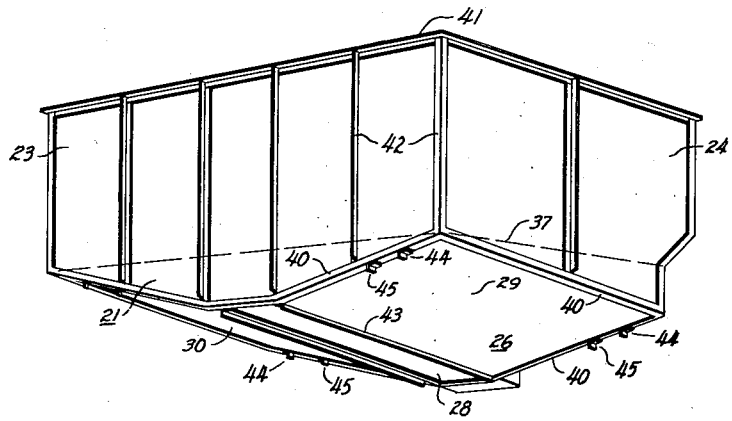
Figure 1 is a view in perspective of a wagon box constructed in accordance with a preferred embodiment of my invention.
Figure 2:
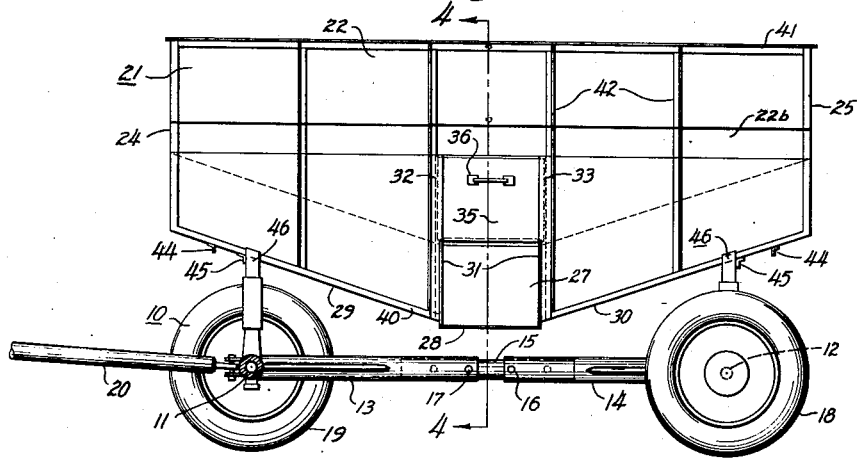
Figure 2 is a view, in side elevation, of the wagon box illustrated in Figure 1 with a supporting chassis in the form of a trailer.

Vehicles of the type under consideration employed in transporting bulk materials such as oats, shelled or ear corn, and the like, generally comprise a demountable wagon box supported by a vehicle such as the trailer indicated generally at 10 in Figure 2. Such a trailer may include front and rear axles 11 and 12 respectively, joined together by a centrally disposed tie bar including tubular members 13 and 14. These members are secured together by the telescoping member 15 and secured to that member by pins 16 and 17. The openings in the telescoping member 15, through which the pins pass, are elongated to permit the wheels to adapt themselves to the surface of the ground.

The wheels 18 are mounted upon the rear axle 12, and wheels 19 are mounted on swivels on the front axle 11 in accordance with the usual practice and in such a manner that the front wheels are steered by lateral movement of the draw-bar or tongue 20.

A wagon box designed to accomplish the purposes of my invention and to be used in conjunction with such a supporting vehicle is indicated generally at 21. Such a wagon box includes near and far side wall members 22 and 23 respectively, end walls 24 and 25, and a bottom wall indicated generally at 26.

The near side wall 22 is provided, at its lowermost portion, with a discharge opening 27 generally midway between the box ends 24 and 25. The bottom 26 includes a bottom plate 28, of substantially the same width as the discharge opening 27, and extending transversely the width of the wagon box to provide a chute. This bottom plate slants downwardly toward the discharge opening at an angle depending upon the type of material being handled. The forward and rear bottom plates 29 and 30 are secured to the side and end walls at their edges and also to the central bottom plate or chute 28. The bottom plates 29 and 30 slant toward the discharge side of the wagon box at substantially the same angle as the chute 28 and these members also slant downwardly from the end walls 24 and 25 toward the chute. The floor thus slants toward the discharge opening 27 from all directions.

The chute 28 extends outwardly beyond the near side wall 22 of the box, as shown best in Figure 4, so as to discharge material from the box generally beyond the vehicle wheels. The side walls 31, of the discharge chute, are secured to the vertical guide plates 32 and 33, these members being secured to the side wall 22 of the box by means of the spacers 34 adjacent the sides of the discharge opening. The discharge door 35 is slideable behind the vertical guides 32 and 33 and a handle 36 is secured to the discharge door to permit its being raised or lowered as desired.

The box is supported in an off-center position relative to the chassis, in such a manner that, when the lower irregular portion of the box is loaded, up to a height on a level with the highest part of any of the bottom plates, as at 37, the center of gravity of the load will lie directly above the longitudinal center-line of the chassis.

The upper portion of the side wall 22, that is, the portion 22–A above the level of the lower irregular portion of the box, is offset to such a degree that the center of gravity of the upper portion of the box, when loaded, will lie immediately above the center of gravity of the lower portion of the box as well as above the center line of the chassis. The side walls 23 and 22–A should obviously be equi-distant from the center line of the vehicle. The offset or angular portion 22–B of the side wall 22 would, theoretically, need to be a horizontal plate, but for obvious practical reasons, this portion of the side wall 22 is inclined downwardly toward the interior of the box at such an angle that bulk materials will not cling to that member.

The entire box, although it may be constructed of wood and metal, is preferably of all-steel construction, reinforced along its bottom edges by the angle irons 40, along its top edges by the angle irons 41, and by spaced vertical ribs 42. The bottom of the box is also preferably reinforced by ribs or angle members 43, particularly along the central or deepest portion of the box.

The bottom reinforcement angles 40 have secured thereto a plurality of fixed stops or bolster guides 44 and 45. These may be small angle members welded to the reinforcing angles 40 at spaced distances from the ends of the box as best shown in Figure 2.

One of the bolsters 46, upon which the wagon box is supported, is shown in detail in Figure 5, and includes the angularly disposed upper crossbar 47 adapted to contact the slanted under surface of the wagon box, and the built-up frame portion including the side plates 48 and 49, which members are secured together in spaced relation by the end and bottom members indicated generally at 50.

The upper cross member 47 is provided at its ends with the upstanding flanges 51 and 52 which are so positioned as to engage the side walls of the wagon box to prevent any lateral movement of the box. Endwise movement of the box, relative to the chassis, is prevented by the bolster guides 44 or 45. The rear bolster-support 53 comprises a built-up, box-like structure 54 of generally rectangular shape, bolted to the rear axle 12. The uprights 55 and 56 are adapted to engage the bolster within its flanged edges 57 and 58.

The wagon box may be lowered, relative to the ground, by lengthening the wheel base of the vehicle and placing the box on the bolsters adjacent the outermost bolster guides 44. The wheel base may be lengthened as desired by unpinning and adjusting the telescoping member 15 and again securing that member by means of the pins 16 and 17.

Tie rods 59 and 60 are provided between and secured to the side walls by welding or bolting.

A wagon box, constructed in accordance with my invention, has numerous advantages. It is, for all practical purposes, self-unloading and requires a minimum of effort on the part of the operator. No auxiliary equipment such as hoists are required in emptying the box. Small quantities of material may be released from the discharge opening of the box as desired and this quantity may be readily controlled. This feature is especially valuable when bulk feed is to be distributed over a wide area for feeding livestock. This side delivery of the box is particularly well adapted to farm use, since it enables the box to be driven along-side an elevator and the material discharged free from the wheels of the vehicle and without the necessity of backing the vehicle into place.

Although I have described a specific embodiment of my invention, it is apparent that modifications thereof may be made by those skilled in the art. Such modifications may be made without departing from the spirit and scope of my invention as set forth in the appended claims.

What I claim is:

1. In a farm vehicle, a chassis including a forward axle, a pair of forward wheels, a rear axle, a pair of rear wheels and a tie-bar connecting and spacing said axles, a vehicle box having a discharge opening midway the length thereof, the said box having bottom members slanting downwardly from the ends of the box toward the discharge opening, a bolster mounted generally above each end of the supporting chassis for engaging the slanting bottom members of the box, means for adjusting the length of the tie-bar to adjust the relative distance between the bolsters for selectively supporting the said box and its discharge opening at various heights relative to the ground, and a plurality of bolster guides projecting from the undersides of the bottom members and selectively engageable with the bolsters.

2. In a vehicle for transporting bulk materials, a box including a pair of side walls, a pair of end walls, and bottom walls, one of the side walls having a discharge opening at its bottom and midway the ends thereof, the bottom walls slanting downwardly toward the discharge opening from the end walls and from the other of the side walls, a chassis including wheels, and bolsters for supporting the box from the chassis, the box being mounted transversely off-center relative to the chassis whereby the center of gravity of the box when loaded, lies above the longitudinal center line of the chassis.

3. In a vehicle for transporting bulk materials, a box including a pair of side walls, a pair of end walls, and bottom walls, one of the side walls having a discharge opening at its bottom and midway the ends thereof, the bottom walls slanting downwardly toward the discharge opening from the end walls and from the other of the side walls, a chassis including wheels, and bolsters for supporting the box from the chassis, the box, up to a height level with the highest part of the bottom walls, being mounted in a transversely, off-center position, relative to the chassis, whereby the center of gravity of the said portion of the box, when loaded, lies above the longitudinal center line of the chassis.

4. In a vehicle for transporting bulk materials, a box including bottom, end and side walls, one of the said side walls having a discharge opening at its bottom and generally midway between the ends thereof, the bottom walls slanting downwardly toward the discharge opening from all directions, a chassis, wheels for the chassis and bolsters for supporting the box from the chassis, the said box being mounted in a transversely off-center position, relative to the chassis, such that the center of gravity of the box, when loaded up to a point level with the highest part of the bottom wall, lies above the longitudinal center-line of the chassis.

5. In a vehicle for transporting bulk materials, a box including bottom, end and side walls, one of the said side walls having a discharge opening at its bottom and generally midway between the ends thereof, the bottom walls slanting downwardly toward the discharge opening from all directions, a chassis, wheels for the chassis and bolsters for supporting the box from the chassis, the said box being mounted in a transversely off-center position, relative to the chassis, such that the center of gravity of the box, when loaded up to a point level with the highest part of the bottom wall, lies above the longitudinal center-line of the chassis, the side wall including the opening having a laterally and outwardly off-set extension generally above the said level and of such size that the center of gravity of the portion of the box above said level, when loaded, also lies above the longitudinal center-line of the said chassis.

ERVIN FRANZ ZUBER.

REFERENCES CITED

The following references are of record in the file of this patent:

UNITED STATES PATENTS

| Number | Name | Date |
| --- | --- | --- |
| 471,402 | Sheldon | Mar. 22, 1892 |
| 535,991 | Marx | Mar. 19, 1895 |
| 1,157,486 | Wright | Oct. 19, 1915 |
| 1,273,214 | Gleason | July 23, 1918 |

FOREIGN PATENTS

| Number | Country | Date |
| --- | --- | --- |
| 151,534 | Germany | of 1904 |